US008089705B2

(12) United States Patent
Yamagata et al.

(10) Patent No.: US 8,089,705 B2
(45) Date of Patent: Jan. 3, 2012

(54) OBJECTIVE LENS FOR OPTICAL PICK-UP

(75) Inventors: Naoki Yamagata, Tokyo (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 728 days.

(21) Appl. No.: 12/103,910

(22) Filed: Apr. 16, 2008

(65) Prior Publication Data
US 2008/0259775 A1 Oct. 23, 2008

(30) Foreign Application Priority Data

Apr. 23, 2007 (JP) .................................. 2007-112814

(51) Int. Cl.
*G02B 13/18* (2006.01)
(52) U.S. Cl. .......................... 359/719; 359/708; 359/718
(58) Field of Classification Search .................. 359/708, 359/718, 719
See application file for complete search history.

(56) References Cited

U.S. PATENT DOCUMENTS

| 4,904,062 | A | * | 2/1990 | Morishita et al. | ............. 359/708 |
| 6,819,504 | B2 | | 11/2004 | Maruyama | |
| 7,054,254 | B2 | | 5/2006 | Maruyama | |
| 7,123,424 | B2 | * | 10/2006 | Sekine | ............. 359/719 |
| 2002/0097661 | A1 | | 7/2002 | Itonaga et al. | |
| 2005/0078593 | A1 | | 4/2005 | Maruyama et al. | |
| 2005/0157624 | A1 | | 7/2005 | Koreeda et al. | |
| 2005/0281173 | A1 | | 12/2005 | Koreeda et al. | |
| 2006/0181978 | A1 | | 8/2006 | Koreeda et al. | |
| 2008/0074976 | A1 | | 3/2008 | Nishikawa et al. | |

FOREIGN PATENT DOCUMENTS

| CN | 1749797 | 3/2006 |
| JP | 2003-85806 | 3/2003 |
| JP | 2003-232995 | 8/2003 |
| JP | 2005-156719 | 6/2005 |

OTHER PUBLICATIONS

English language Abstract of JP 2003-232995., Aug. 22, 2003.
English language Abstract of JP 2005-156719., Jun. 16, 2005.
China Office action, dated Oct. 2010 along with an English translation thereof., Oct. 28, 2010.

* cited by examiner

*Primary Examiner* — Scott J Sugarman
(74) *Attorney, Agent, or Firm* — Greenblum & Bernstein P.L.C.

(57) ABSTRACT

There is provided an objective lens for an optical pick-up. The objective lens includes a first surface on a light source side, and a second surface on an optical disc side. The first surface has a convex shape. The objective lens is formed to be a single-element lens having a numerical aperture of 0.75 or more. In this configuration, the objective lens satisfies a condition:

$$0.95 < (n-1) \cdot \tan \theta_{max} < 1.50 \tag{1}$$

where $\theta_{max}$ represents a maximum angle of a normal to the first surface with respect to an optical axis in an effective diameter of the first surface, and n represents a refractive index of the objective lens.

7 Claims, 10 Drawing Sheets

WAVEFRONT ABERRATION

Y = 0.00

SPHERICAL ABERRATION, SINE CONDITION

—— SA
······ SC

WAVEFRONT ABERRATION

Y = 0.00     +0.10

−0.10

SPHERICAL ABERRATION,
SINE CONDITION

— SA
····· SC

−0.01   0.01

WAVEFRONT ABERRATION
Y = 0.00    +0.10
            -0.10

SPHERICAL ABERRATION,
SINE CONDITION

—— SA
------ SC

-0.01   0.01

WAVEFRONT ABERRATION

SPHERICAL ABERRATION, SINE CONDITION

WAVEFRONT ABERRATION

Y=0.00    +0.10

−0.10

SPHERICAL ABERRATION,
SINE CONDITION

—— SA
---- SC

−0.01  0.01

OBJECTIVE LENS FOR OPTICAL PICK-UP

BACKGROUND OF THE INVENTION

The present invention relates to an objective lens for an optical pick-up used for recording data to and/or reproducing data from an optical disc, such as a blu-ray disc, having a higher recording density than a DVD.

Recently, objective lenses for an optical pick-up used for recording data to and/or reproducing data from an optical disc having a higher recording density than a DVD have been proposed. An example of such an objective lens is disclosed in Japanese Patent Provisional Publication No. 2003-85806A (hereafter, referred to as JP2003-85806A).

The objective lens disclosed in JP2003-85806A has a first surface on a light source side and a second surface on an optical disc side. The first and second surfaces of the objective lens are a convex surface and a concave surface, respectively. That is, the objective lens is a single-element lens having a meniscus shape. To cancel the spherical aberration caused by change of the thickness of the optical disc with change of the degree of divergence of a light beam incident on the objective lens, the objective lens is configured to have an offence against a sine condition exhibiting a positive local maximum value in a range of 60 to 90 percent of an effective radius of the objective lens.

Although the theoretical performance of the above mentioned objective lens may be excellent, the objective lens has a drawback that the sensitivity to the decentering amount between lens surfaces or an error in lens thickness caused during manufacturing of the objective lens is high. Therefore, even a small level of manufacturing errors is not permitted for achieving the theoretical performance of the objective lens. Consequently, manufacturing conditions of the objective lens becomes very strict.

In addition, the first surface of the above mentioned objective lens has a steep gradient in the periphery thereof, which further increases the difficulty of manufacturing of the objective lens.

SUMMARY OF THE INVENTION

The present invention is advantageous in that it provides an objective lens having a high numerical aperture for an optical disc having a high recording density, such as a blu-ray disc, exhibiting a low sensitivity to manufacturing errors, and providing excellent manufacturability.

According to an aspect of the invention, there is provided an objective lens for an optical pick-up. The objective lens includes a first surface on a light source side, and a second surface on an optical disc side. The first surface has a convex shape. The objective lens is formed to be a single-element lens having a numerical aperture of 0.75 or more. In this configuration, the objective lens satisfies a condition:

$$0.95 < (n-1) \cdot \tan \theta_{max} < 1.50 \qquad (1)$$

where $\theta_{max}$ represents a maximum angle of a normal to the first surface with respect to an optical axis in an effective diameter of the first surface, and n represents a refractive index of the objective lens.

With this configuration, it becomes possible to decrease the sensitivity of the objective lens to the manufacturing errors including the decentering of lens surfaces and an error in lens thickness. Therefore, it is possible to increase tolerance to the manufacturing errors and thereby to enhance the manufacturability of the objective lens. The fact that the condition (1) is satisfied also contributes to enhancing the manufacturability of the objective lens because the gradient of the first surface with respect to the optical axis can be suppressed to a low level when the condition (1) is satisfied.

According to another aspect of the invention, there is provided an objective lens for an optical pick-up. The objective lens includes a first surface on a light source side, and a second surface on an optical disc side. The first surface has a convex shape. The objective lens is formed to be a single-element lens having a numerical aperture of 0.75 or more. In this configuration, the objective lens has a negative local minimum value of an offence against a sine condition in a range of a height of an incident beam from 60 to 90 percent in an effective radius of the objective lens.

With this configuration, it becomes possible to decrease the sensitivity of the objective lens to the manufacturing errors including the decentering of lens surfaces and an error in lens thickness. Therefore, it is possible to increase tolerance to the manufacturing errors and thereby to enhance the manufacturability of the objective lens.

Regarding the above mentioned two aspects of the invention, the objective lens may satisfy a condition:

$$-0.030 < SC_{max}/f < -0.003 \qquad (2)$$

where $SC_{max}$ represents a negative local minimum value of an offence against the sine condition of the objective lens, and f represents a focal length of the objective lens.

In at least one aspect, the objective lens has the refractive index larger than or equal to 1.7.

In at least one aspect, the objective lens satisfies a condition:

$$1.65 < (d \cdot n)/f < 2.50 \qquad (3)$$

where f represents a focal length of the objective lens, d represents a thickness of the objective lens, and n represents a refractive index of the objective lens.

BRIEF DESCRIPTION OF THE ACCOMPANYING DRAWINGS

Figure 23:
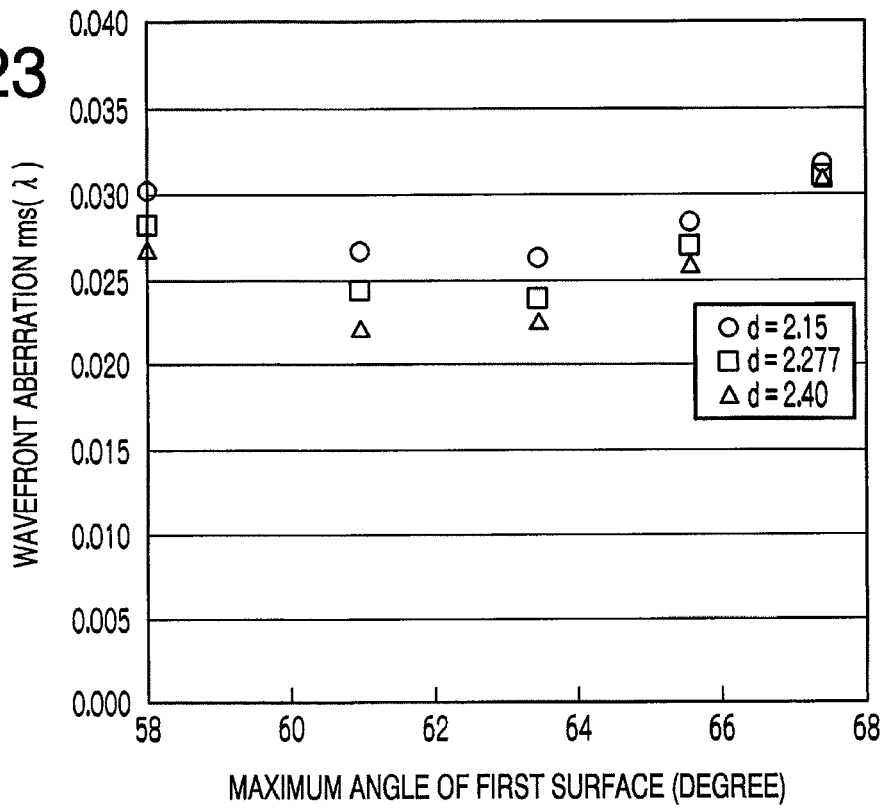

FIG. 23 a graph illustrating, for each of three types of objective lenses having different thicknesses, the wavefront aberration caused when the decentering of 1 μm occurs between lens surfaces of an objective lens with respect to the maximum angle of a normal to a first surface of the objective lens with respect to the optical axis.

Figure 24:
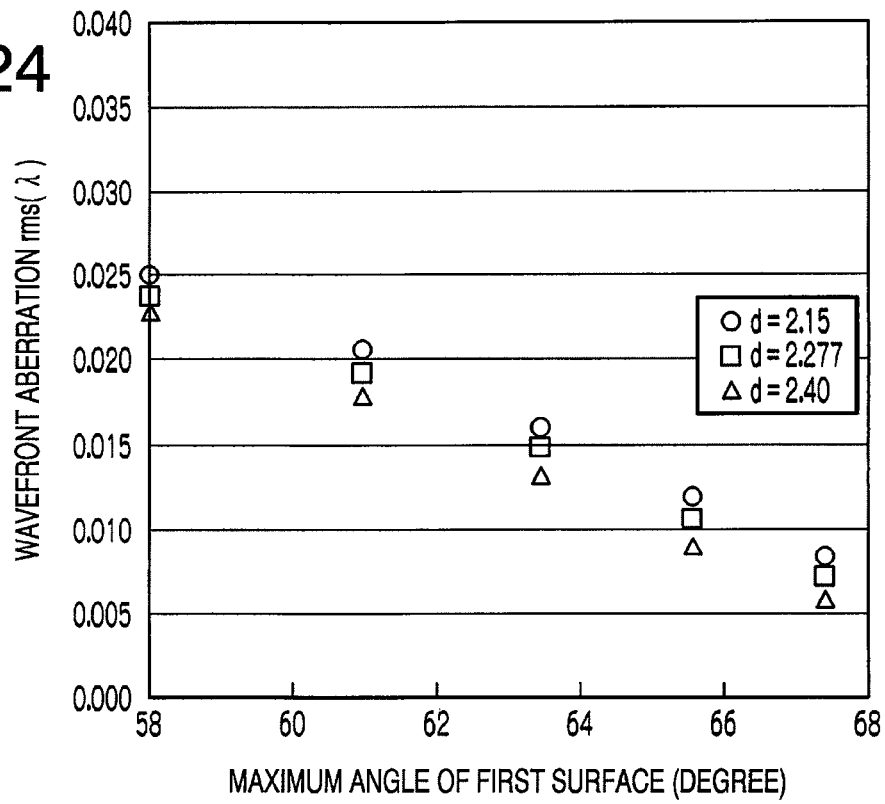

FIG. 24 is a graph illustrating, for each of three types of objective lenses having different thicknesses, the wavefront aberration caused when the amount of increase of 1 μm in lens thickness occurs during the manufacturing with respect to the maximum angle of a normal to a first surface of the objective lens with respect to the optical axis.

DETAILED DESCRIPTION OF THE EMBODIMENTS

Hereinafter, an objective lens according to an embodiment of the present invention is described with reference to the accompanying drawings.

The objective lens is used for an optical pick-up for an optical disc (e.g., a blu-ray disc) having a higher recording density than that of a DVD. The structure of the objective lens is illustrated, for example, in FIG. 1 which is explained in detail later. Hereafter, a numerical sign "10" is assigned to the objective lens according to the embodiment. In the optical pick-up, a laser beam emitted by a light source is incident on the objective lens 10 as a collimated beam. The objective lens 10 has a function of converging the incident laser beam (the collimated laser beam) to form a beam spot on a record surface of the optical disc.

Figure 1:
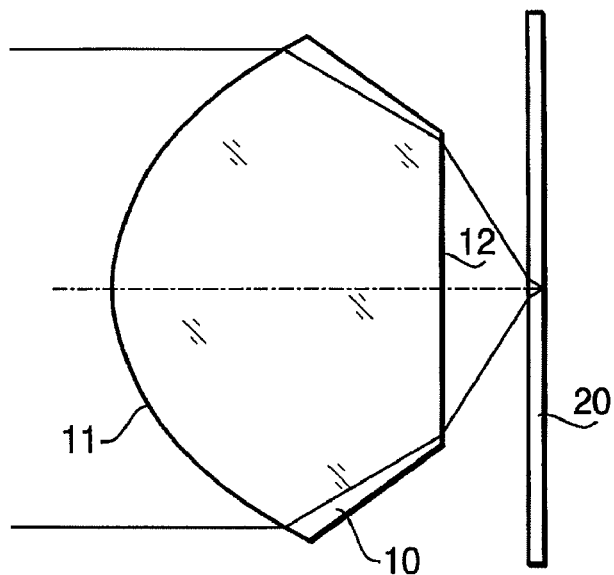
FIG. 1 is a cross sectional view illustrating an objective lens according to a first example.

As shown in FIG. 1 as an example, the objective lens 10 is a single-element lens having a first surface 11 on a light source side and a second surface 12 on an optical disc side. The objective lens has a high numerical aperture. Specifically, the numerical aperture of the objective lens 10 is larger than or equal to 0.75.

The objective lens 10 is configured to satisfy a condition:

$$0.95 < (n-1) \cdot \tan \theta_{max} < 1.50 \qquad (1)$$

where $\theta_{max}$ represents the maximum angle of a normal to the first surface 11 with respect to an optical axis in an effective diameter of the first surface 11, and n represents a refractive index of the objective lens 10.

The condition (1) defines the refractive index and the maximum angle of the normal to the first surface 11 with respect to the optical axis to suppress deterioration of aberrations with respect to manufacturing errors including the decentering of lens surfaces and an error in lens thickness. By satisfying the condition (1), the objective lens 10 is able to suppress the sensitivity of deterioration of aberrations to the manufacturing errors.

If the intermediate term of the condition (1) gets lower than or equal to the lower limit of the condition (1), the sensitivity of the spherical aberration to a manufacturing error in thickness of the objective lens 10 becomes high. If the intermediate term of the condition (1) gets larger than or equal to the upper limit of the condition (1), the sensitivity of a coma to the decentering between the first surface 11 and the second surface 12 becomes high.

Figure 19:
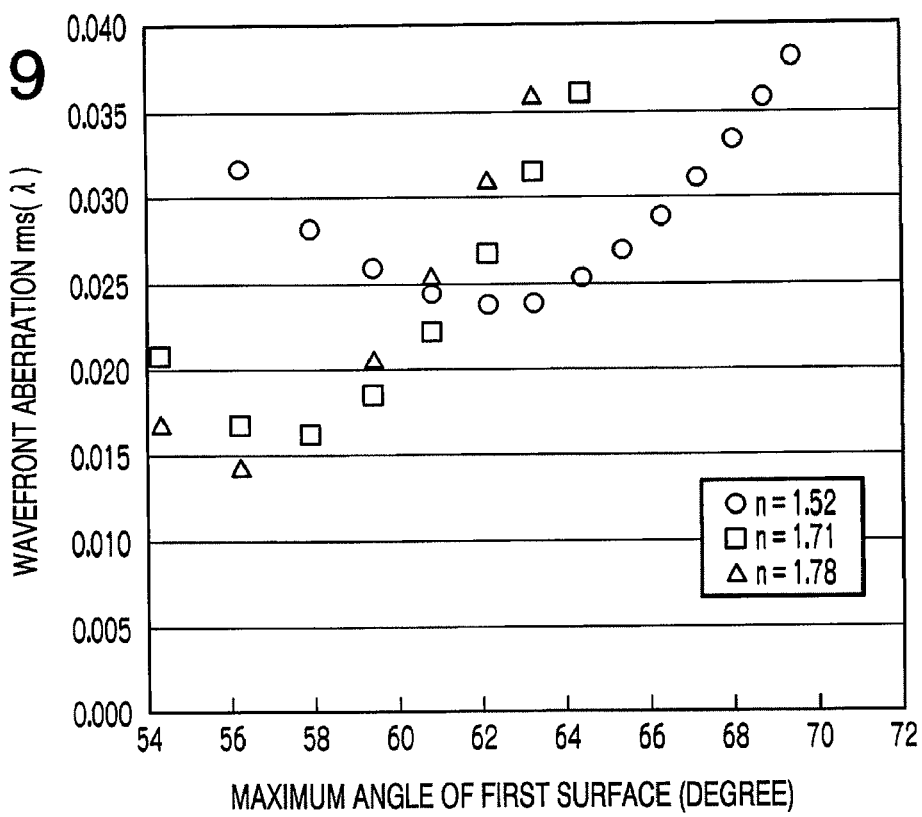
FIG. 19 is a graph illustrating, for each of three types of objective lenses having different refractive indexes, the wavefront aberration caused when the decentering of 1 μm occurs between lens surfaces of an objective lens with respect to the maximum angle of a normal to a first surface of the objective lens with respect to the optical axis.

Technical grounds for defining the refractive index and the angle of the normal to the first surface 11 with respect to the optical axis will now be explained with reference to FIGS. 19 and 20. FIG. 19 is a graph illustrating the wavefront aberration caused when the decentering of 1 μm occurs between lens surfaces of a lens with respect to the maximum angle $\theta_{max}$ of the normal to a first surface (a light source side) of a lens with respect to the optical axis in the effective diameter of the lens. In each of FIGS. 19 and 20, the graph is illustrated for each of three types of lenses having different refractive indexes. Each of the three types of lenses has a focal length of 1.765 mm and the lens thickness of 2.277 mm.

Figure 20:
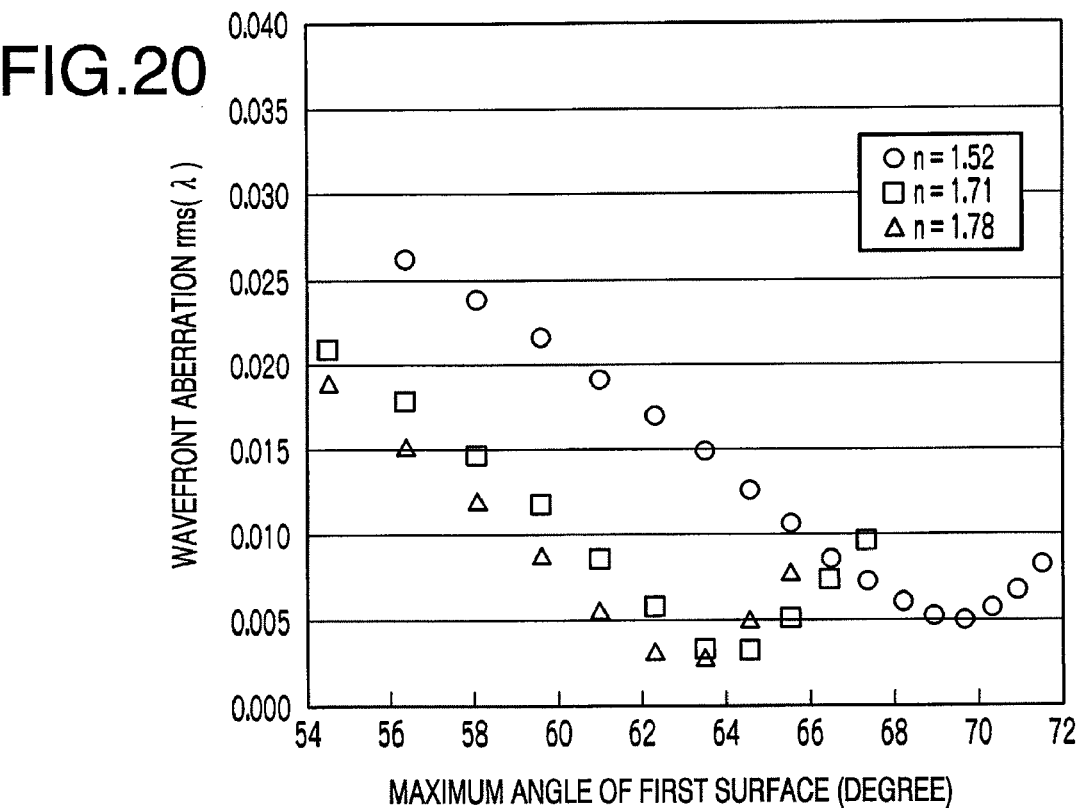
FIG. 20 is a graph illustrating, for each of three types of objective lenses having different refractive indexes, the wavefront aberration caused when the amount of increase of 1 μm in lens thickness occurs during the manufacturing with respect to the maximum angle of a normal to a first surface of an objective lens with respect to the optical axis.

FIG. 20 is a graph illustrating the wavefront aberration caused when the amount of increase of 1 μm in lens thickness occurs during the manufacturing with respect to the maximum angle $\theta_{max}$ of the normal to the first surface of the lens with respect to the optical axis in the effective diameter of the lens. In each of FIGS. 19 and 20, the curve indicated by circles corresponds to a lens having the refractive index of 1.52, the curve indicated by rectangles corresponds to a lens having the refractive index of 1.71, and the curve indicated by triangles corresponds to a lens having the refractive index of 1.78.

As can be seen from FIG. 19, the minimum value of the wavefront aberration caused by the decentering (i.e., the wavefront aberration caused principally by a coma due to the decentering) decreases with the increase of the refractive index, and the maximum angle of the normal to the first surface of the lens (in the effective diameter of the first surface) with respect to the optical axis defined at the minimum value of the wavefront aberration also decreases with the increase of the refractive index. More specifically, if the refractive index is larger than or equal to 1.7, the coma due to the decentering can be suppressed to a low level when the maximum angle of the normal to the first surface of the lens (in the effective diameter of the first surface) with respect to the optical axis lies in a range of approximately 54 to 58 degrees.

As can be seen from FIG. 20, the minimum value of the wavefront aberration caused by an error in lens thickness (i.e., the wavefront aberration caused principally by the spherical aberration) decreases with the increase of the refractive index, and the maximum angle of the normal to the first surface of the lens (in the effective diameter of the first surface) with respect to the optical axis defined at the minimum value of the wavefront aberration also decreases with the increase of the refractive index. More specifically, if the refractive index is larger than or equal to 1.7, the spherical aberration to an error in lens thickness can be suppressed to a low level when the maximum angle of the normal to the first surface of the lens (in the effective diameter of the first surface) with respect to the optical axis lies in a range of approximately 62 to 65 degrees.

Therefore, the condition (1) requires the maximum angle $\theta_{max}$ of the normal to the first surface 11 with respect to the optical axis in the effective diameter of the first surface 11 to be within the range of approximately 54 to 65 degrees when the refractive index is 1.7, and requires the maximum angle $\theta_{max}$ of the normal to the first surface 11 with respect to the optical axis in the effective diameter of the first surface 11 to be within the range of approximately 62 to 72 degrees when the refractive index is 1.5.

By satisfying the condition (1) (i.e., when the above mentioned relationship between the refractive index and the maximum angle of the normal to the first surface 11 with respect to the optical axis satisfies the condition (1)), the sensitivity to the manufacturing errors including the decentering and an error in lens thickness can be suppressed to a low level.

The objective lens 10 is configured such that the offence against the sine condition has a negative value for the laser beam incident on the objective lens 10 in the height range of 60 to 90 percent of the effective radius of the objective lens 10. Hereafter, meaning of the fact that the sine condition has a negative local minimum value is explained with reference to FIGS. 21 and 22.

Figure 21:
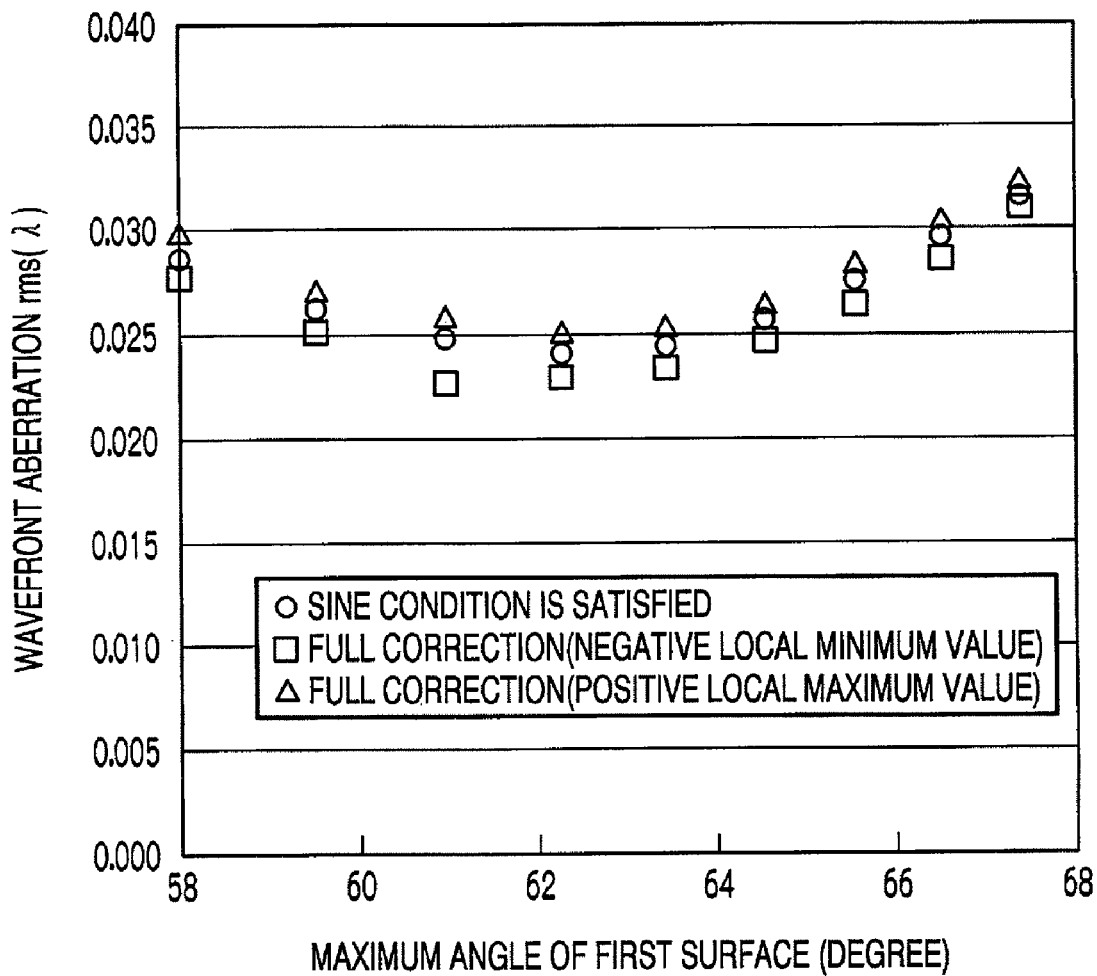
FIG. 21 is a graph illustrating, for each of three types of objective lenses having different patterns of the offence against the sine condition, the wavefront aberration caused when the decentering of 1 μm occurs between lens surfaces of an objective lens with respect to the maximum angle of a normal to a first surface of the objective lens with respect to the optical axis.

FIG. 21 is a graph illustrating the wavefront aberration caused when the decentering of 1 μm occurs between lens surfaces of a lens with respect to the maximum angle $\theta_{max}$ of the normal to a first surface (a light source side) of the lens with respect to the optical axis. In each of FIGS. 21 and 22, the graph is illustrated for each of three types of lenses having different offence against the sine condition. Each of the three types of lenses has a focal length of 1.765 mm, the lens thickness of 2.277 mm and the refractive index of 1.52 at the wavelength of 408 nm).

Figure 22:
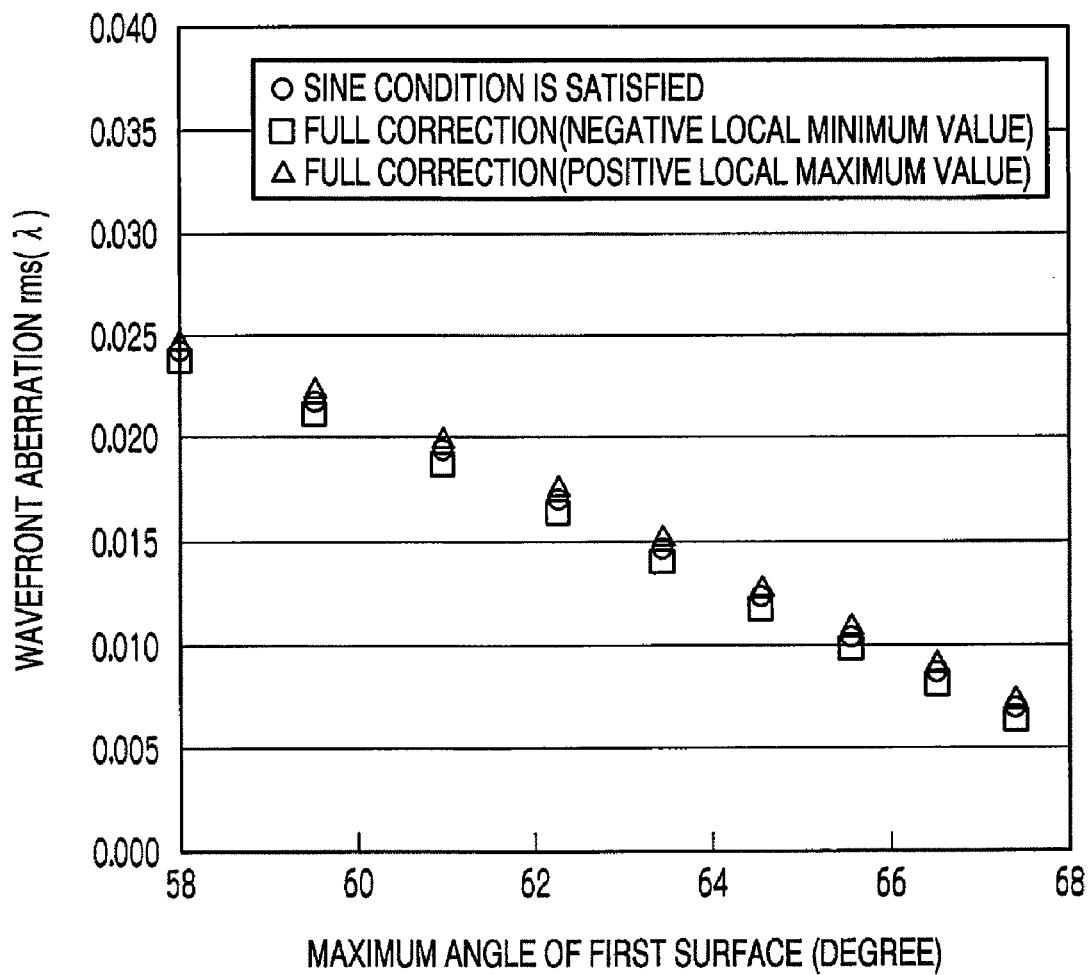
FIG. 22 is a graph illustrating, for each of three types of objective lenses having different patterns of the offence against the sine condition, the wavefront aberration caused when the amount of increase of 1 μm in lens thickness occurs during the manufacturing with respect to the maximum angle of a normal to a first surface of an objective lens with respect to the optical axis.

FIG. 22 is a graph illustrating the wavefront aberration caused when the amount of increase of 1 μm in lens thickness occurs during the manufacturing with respect to the maximum angle $\theta_{max}$ of the normal to the first surface of the lens with respect to the optical axis. In each of FIGS. 21 and 22, the curve indicated by circles corresponds to a lens satisfying the sine condition in the entire height range of an incident beam, the curve indicated by rectangles corresponds to a lens exhibiting the sine condition having a negative local minimum value in a state of full correction, and the curve indicated by triangles corresponds to a lens exhibiting the sine condition having a positive local maximum value in a state of full correction. It should be noted that the curve indicated by triangles corresponds to an objective lens according to the embodiment and the curve indicated by rectangles corresponds to a conventional lens.

As can be seen from FIG. 21, the property of the relationship between the wavefront aberration caused by the decentering (i.e., the wavefront aberration caused principally by a coma due to the decentering) and the maximum angle of the normal to the first surface of the lens with respect to the optical axis is maintained regardless of patterns regarding the offence against the sine condition, while the value of the wavefront aberration takes a minimum value for a lens exhibiting the sine condition having a negative local minimum value in the state of full correction.

As can be seen from FIG. 22, the property of the relationship between the wavefront aberration caused by an error in lens thickness (i.e., the wavefront aberration caused principally by the spherical aberration) and the maximum angle of the normal to the first surface of the lens with respect to the optical axis is maintained regardless of patterns regarding the offence against the sine condition, while the value of the wavefront aberration takes a minimum value for a lens exhibiting the sine condition having a negative local minimum value in the state of full correction.

Therefore, the aberrations caused by manufacturing errors including the decentering and an error in lens thickness can be suppressed to low levels in the case where the sine condition has a negative local minimum value in the state of full correction. Regarding the sensitivity of deterioration of aberrations to the manufacturing errors, it is possible to achieve a balance between the sensitivity of deterioration of aberrations to the decentering and the sensitivity of deterioration of aberrations to an error in lens thickness, in the range of approximately 63 to 68 degrees for the maximum angle $\theta_{max}$ of the normal to the first surface of the lens with respect to the optical axis, when the refractive index is 1.5.

The objective lens 10 may be configured to satisfy a condition:

$$-0.030 < SC_{max}/f < -0.003 \tag{2}$$

where $SC_{max}$ represents a negative local minimum value of the offence against the sine condition of the objective lens 10, and f represents a focal length of the objective lens 10.

The condition (2) defines an appropriate numeric range for setting the offence against the sine condition. If $SC_{max}/f$ gets lower than or equal to the lower limit of the condition (2), a design amount of an off-axis coma becomes too large. If $SC_{max}/f$ gets larger than or equal to the upper limit of the condition (2), the sensitivity of deterioration of aberrations to the manufacturing errors becomes too high.

The objective lens 10 may be configured to satisfy a condition:

$$1.65 < (d \cdot n)/f < 2.50 \tag{3}$$

where d represents the thickness of the objective lens 10. The thickness "d" of the objective lens 10 may be defined as a thickness of the objective lens 10 along the optical axis.

The condition (3) is a condition for preventing the deterioration of aberrations with respect to the manufacturing errors including the decentering and an error in lens thickness by defining the lens thickness and the refractive index of the lens. If $(d \cdot n)/f$ gets lower than or equal to the lower limit of the condition (3), the angle of the normal to the first surface 11 with respect to the optical axis becomes steep in the periphery of the objective lens 10 or the sensitivity of deterioration of aberrations to the manufacturing errors becomes high. If $(d \cdot n)/f$ gets larger than or equal to the upper limit of the condition (3), a required working distance for an optical pickup can not be secured.

The meaning of the condition (3) is explained with reference to FIGS. 23 and 24. FIG. 23 a graph illustrating the wavefront aberration caused when the decentering of 1 μm occurs between lens surfaces of a lens with respect to the maximum angle $\theta_{max}$ of the normal to a first surface (a light source side) of the lens with respect to the optical axis. FIG. 24 is a graph illustrating the wavefront aberration caused when the amount of increase of 1 μm in lens thickness occurs during the manufacturing with respect to the maximum angle $\theta_{max}$ of the normal to the first surface of the lens with respect to the optical axis.

In each of FIG. 23 and FIG. 24, the graph is illustrated for each of three types of lenses having different lens thicknesses. More specifically, the curve indicated by circles corresponds to a lens having the lens thickness d of 2.15 mm, the curve indicated by rectangles corresponds to a lens having the lens thickness d of 2.277 mm, and the curve indicated by triangles corresponds to a lens having the lens thickness d of 2.40 mm. Each of the three types of lenses has a focal length of 1.765 mm and the refractive index of 1.52 at the wavelength of 408 nm.

As can be seen from FIG. 23, the property of the relationship between the wavefront aberration caused by the decentering (i.e., the wavefront aberration caused principally by a coma due to the decentering) and the maximum angle of the normal to the first surface of the lens with respect to the optical axis is maintained regardless of the lens thickness, while the value of the wavefront aberration decreases with increase of the lens thickness.

As can be seen from FIG. 24, the property of the relationship between the wavefront aberration caused by an error in lens thickness (i.e., the wavefront aberration caused principally by the spherical aberration) and the maximum angle of the normal to the first surface of the lens with respect to the optical axis is maintained regardless of the lens thickness, while the value of the wavefront aberration decreases with increase of the lens thickness.

That is, the aberrations caused by manufacturing errors including the decentering and an error in lens thickness decrease with increase of the lens thickness.

Hereafter, six concrete examples of the objective lens 10 are described. In each example, a design wavelength of an incident laser beam is set to 408 nm. Incidentally, the above "design wavelength" means the wavelength of the laser beam which is regarded to be optimum for recording data to and/or reproducing data from the optical disc. That is, in each example, the refractive index "n" of the objective lens is defined at the wavelength of 408 nm.

First Example

FIG. 1 is a cross sectional view illustrating the objective lens 10 according to a first example and a protective layer of an optical disc 20. The following Table 1 shows a numerical structure of the objective lens 10 according to the first example. In Table 1 (and in the following similar Tables), f represents a focal length, NA represents a numerical aperture, m represents magnification, r represents a radius of curvature (unit: mm) of each optical surface, d represents a distance on an optical axis between an optical surface and a next optical surface, n represents a refractive index at a design wavelength.

TABLE 1 f = 2.00 mm, NA = 0.85, m = 0, effective radius = 1.70 mm

| Surface No. | r (mm) | d (mm) | n |
|---|---|---|---|
| 1 | 1.478 | 2.350 | 1.709 |
| 2 | −11.820 | 0.619 | |
| 3 | ∞ | 0.100 | 1.622 |
| 4 | ∞ | | |

In Table 1 (and in the following similar Tables), surface #1 is the first surface 11 of the objective lens 10, surface #2 is the second surface 12 of the objective lens 10, and surfaces #3 and #4 represent both surfaces the protective layer of the optical disc 20.

Each of the first and second surfaces 11 and 12 of the objective lens 10 is a rotationally-symmetrical aspherical surface. The rotationally-symmetrical aspherical surface is expressed by a following expression:

$$X(h) = \frac{ch^2}{1 + \sqrt{1 - (1+K)c^2h^2}} + A_4h^4 + A_6h^6 + A_8h^8 + A_{10}h^{10} + A_{12}h^{12} + \ldots$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4, A_6, A_8, A_{10}$ and $A_{12}$ are aspherical coefficients of fourth, sixth, eighth, tenth and twelfth orders, respectively.

Table 2 shows the conical coefficient and aspherical coefficients defining the first and second surfaces 11 and 12 of the objective lens 10 according to the first example.

TABLE 2

| | FIRST SURFACE | SECOND SURFACE |
|---|---|---|
| K | −0.580 | 0.000 |
| $A_4$ | $5.6790 \times 10^{-3}$ | $1.3470 \times 10^{-1}$ |
| $A_6$ | $1.5260 \times 10^{-3}$ | $-1.7550 \times 10^{-1}$ |
| $A_8$ | $-5.4380 \times 10^{-4}$ | $1.2960 \times 10^{-1}$ |
| $A_{10}$ | $4.7800 \times 10^{-4}$ | $-5.1350 \times 10^{-2}$ |
| $A_{12}$ | $-1.2270 \times 10^{-4}$ | $8.3600 \times 10^{-3}$ |

Figure 2:
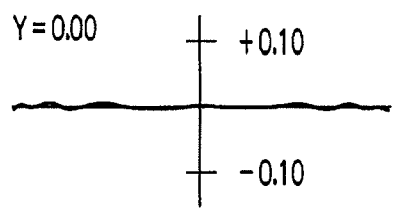
FIG. 2 is a graph illustrating the wavefront aberration of the objective lens according to the first example.
Figure 3:
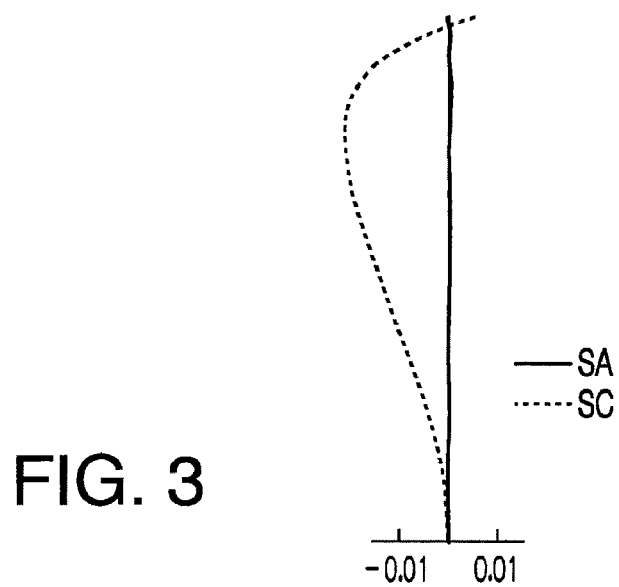
FIG. 3 is a graph illustrating the spherical aberration and the offence against the sine condition of the objective lens according to the first example.

FIGS. 2 and 3 show optical performance of the objective lens 10 according to the first example. More specifically, FIG. 2 is a graph illustrating the axial wavefront aberration, and FIG. 3 is a graph illustrating the spherical aberration (SA) and the sine condition (SC).

Second Example

Figure 4:
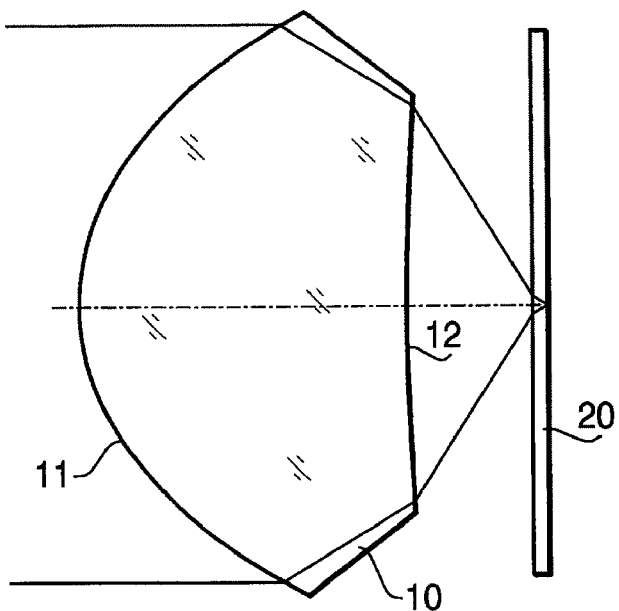
FIG. 4 is a cross sectional view illustrating an objective lens according to a second example.

FIG. 4 is a cross sectional view illustrating the objective lens 10 according to a second example and the protective layer of the optical disc 20. The following Table 3 shows a numerical structure of the objective lens 10 according to the second example.

TABLE 3

| f = 2.35 mm, NA = 0.85, m = 0, effective radius = 2.00 mm | | | |
|---|---|---|---|
| Surface No. | r (mm) | d (mm) | n |
| 1 | 1.734 | 2.350 | 1.760 |
| 2 | 24.194 | 0.913 | |
| 3 | ∞ | 0.100 | 1.622 |
| 4 | ∞ | | |

Each of the first and second surfaces 11 and 12 of the objective lens 10 is a rotationally-symmetrical aspherical surface. Table 4 shows the conical coefficient and aspherical coefficients defining the first and second surfaces 11 and 12 of the objective lens 10 according to the second example.

TABLE 4

| | FIRST SURFACE | SECOND SURFACE |
|---|---|---|
| K | −0.580 | 0.000 |
| $A_4$ | $3.8260 \times 10^{-3}$ | $2.3760 \times 10^{-2}$ |
| $A_6$ | $5.3460 \times 10^{-4}$ | $-2.3160 \times 10^{-2}$ |
| $A_8$ | $-7.0890 \times 10^{-5}$ | $1.0910 \times 10^{-2}$ |
| $A_{10}$ | $5.4279 \times 10^{-5}$ | $-2.7350 \times 10^{-3}$ |
| $A_{12}$ | $-1.4929 \times 10^{-5}$ | $2.8690 \times 10^{-4}$ |

Figure 5:
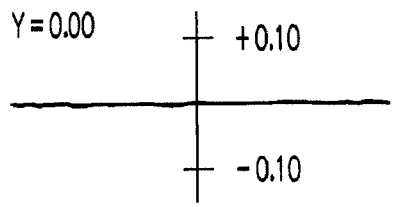
FIG. 5 is a graph illustrating the wavefront aberration of the objective lens according to the second example.
Figure 6:
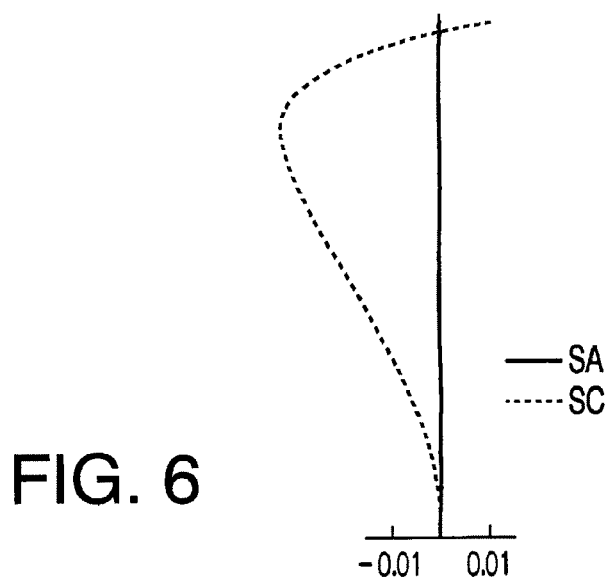
FIG. 6 is a graph illustrating the spherical aberration and the offence against the sine condition of the objective lens according to the second example.

FIGS. 5 and 6 show optical performance of the objective lens 10 according to the second example. More specifically, FIG. 5 is a graph illustrating the axial wavefront aberration, and FIG. 6 is a graph illustrating the spherical aberration (SA) and the sine condition (SC).

Third Example

Figure 7:
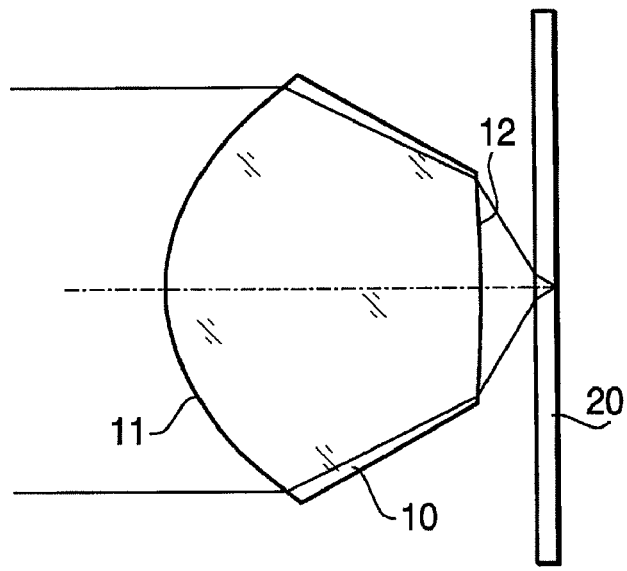
FIG. 7 is a cross sectional view illustrating an objective lens according to a third example.

FIG. 7 is a cross sectional view illustrating the objective lens 10 according to a third example and the protective layer of the optical disc 20. The following Table 5 shows a numerical structure of the objective lens 10 according to the third example.

TABLE 5

| f = 1.00 mm, NA = 0.85, m = 0, effective radius = 0.85 mm | | | |
|---|---|---|---|
| Surface No. | r (mm) | d (mm) | n |
| 1 | 0.817 | 1.350 | 1.760 |
| 2 | −3.146 | 0.446 | |
| 3 | ∞ | 0.100 | 1.622 |
| 4 | ∞ | | |

Each of the first and second surfaces 11 and 12 of the objective lens 10 is a rotationally-symmetrical aspherical surface. Table 6 shows the conical coefficient and aspherical coefficients defining the first and second surfaces 11 and 12 of the objective lens 10 according to the third example.

TABLE 6

| | FIRST SURFACE | SECOND SURFACE |
|---|---|---|
| K | −0.580 | 0.000 |
| $A_4$ | $3.2380 \times 10^{-2}$ | $9.9570 \times 10^{-1}$ |
| $A_6$ | $1.6900 \times 10^{-2}$ | $-7.3630$ |
| $A_8$ | $-5.4020 \times 10^{-2}$ | $3.2120 \times 10$ |
| $A_{10}$ | $1.1650 \times 10^{-1}$ | $-7.8570 \times 10$ |
| $A_{12}$ | $-1.8280 \times 10^{-1}$ | $8.1310 \times 10$ |

Figure 8:
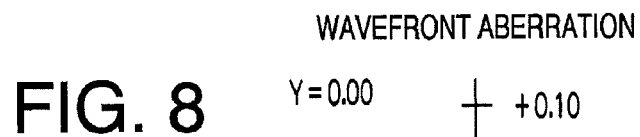
FIG. 8 is a graph illustrating the wavefront aberration of the objective lens according to the third example.
Figure 9:
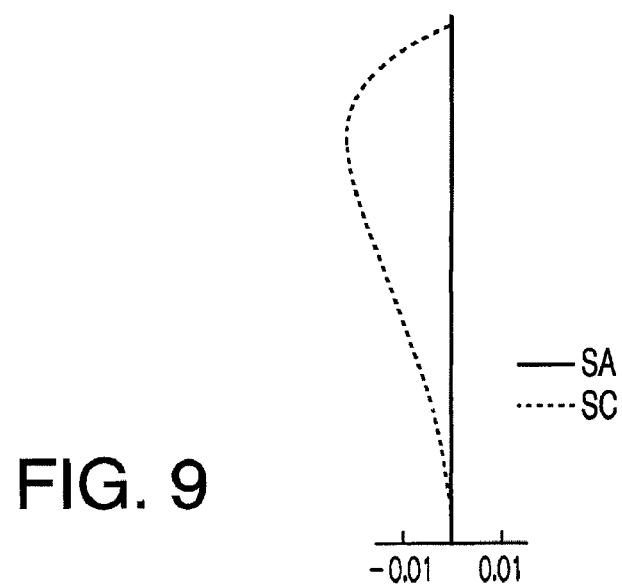
FIG. 9 is a graph illustrating the spherical aberration and the offence against the sine condition of the objective lens according to the third example.

FIGS. 8 and 9 show optical performance of the objective lens 10 according to the third example. More specifically, FIG. 8 is a graph illustrating the axial wavefront aberration, and FIG. 9 is a graph illustrating the spherical aberration (SA) and the sine condition (SC).

Fourth Example

Figure 10:
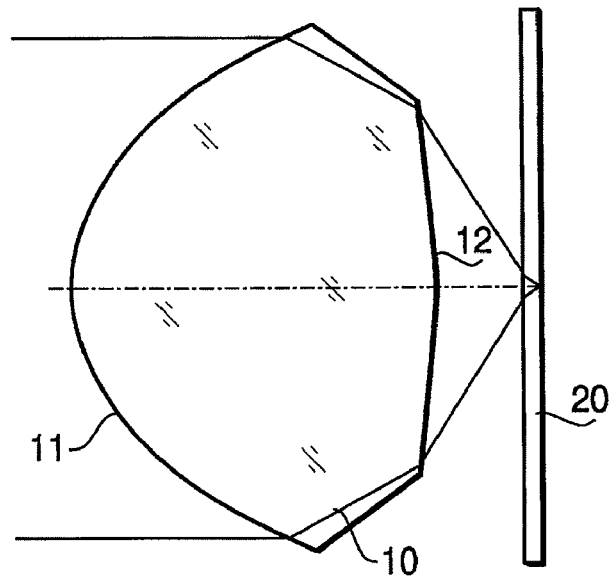
FIG. 10 is a cross sectional view illustrating an objective lens according to a fourth example.

FIG. 10 is a cross sectional view illustrating the objective lens 10 according to a fourth example and the protective layer of the optical disc 20. The following Table 7 shows a numerical structure of the objective lens 10 according to the fourth example.

TABLE 7

| f = 1.55 mm, NA = 0.85, m = 0, effective radius = 1.32 mm | | | |
|---|---|---|---|
| Surface No. | r (mm) | d (mm) | n |
| 1 | 1.005 | 1.950 | 1.525 |
| 2 | −1.417 | 0.453 | |
| 3 | ∞ | 0.100 | 1.622 |
| 4 | ∞ | | |

Each of the first and second surfaces 11 and 12 of the objective lens 10 is a rotationally-symmetrical aspherical surface. Table 8 shows the conical coefficient and aspherical coefficients defining the first and second surfaces 11 and 12 of the objective lens 10 according to the fourth example.

TABLE 8

| | FIRST SURFACE | SECOND SURFACE |
|---|---|---|
| K | −0.680 | 0.000 |
| $A_4$ | $2.2500 \times 10^{-2}$ | $1.2800 \times 10$ |
| $A_6$ | $4.8060 \times 10^{-3}$ | $-4.4670 \times 10$ |
| $A_8$ | $2.4130 \times 10^{-2}$ | $1.1850 \times 10$ |
| $A_{10}$ | $-5.2030 \times 10^{-2}$ | $-2.0350 \times 10$ |
| $A_{12}$ | $6.3160 \times 10^{-2}$ | $2.2060 \times 10$ |
| $A_{14}$ | $-3.0870 \times 10^{-2}$ | $-1.4650 \times 10$ |
| $A_{16}$ | $-1.0929 \times 10^{-2}$ | $5.4922$ |
| $A_{18}$ | $1.7288 \times 10^{-2}$ | $-9.3110 \times 10^{-1}$ |
| $A_{20}$ | $-4.8073 \times 10^{-3}$ | $2.4232 \times 10^{-2}$ |

Figure 11:
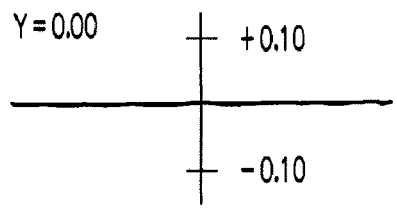
FIG. 11 is a graph illustrating the wavefront aberration of the objective lens according to the fourth example.
Figure 12:
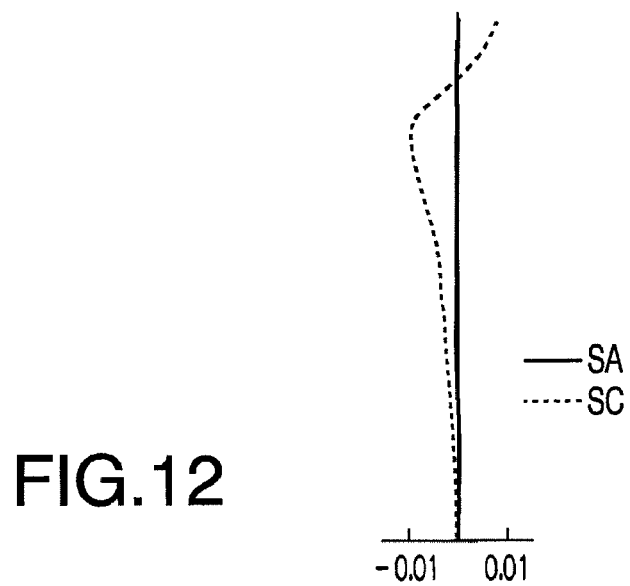
FIG. 12 is a graph illustrating the spherical aberration and the offence against the sine condition of the objective lens according to the fourth example.

FIGS. 11 and 12 show optical performance of the objective lens 10 according to the fourth example. More specifically, FIG. 11 is a graph illustrating the axial wavefront aberration, and FIG. 12 is a graph illustrating the spherical aberration (SA) and the sine condition (SC).

Fifth Example

Figure 13:
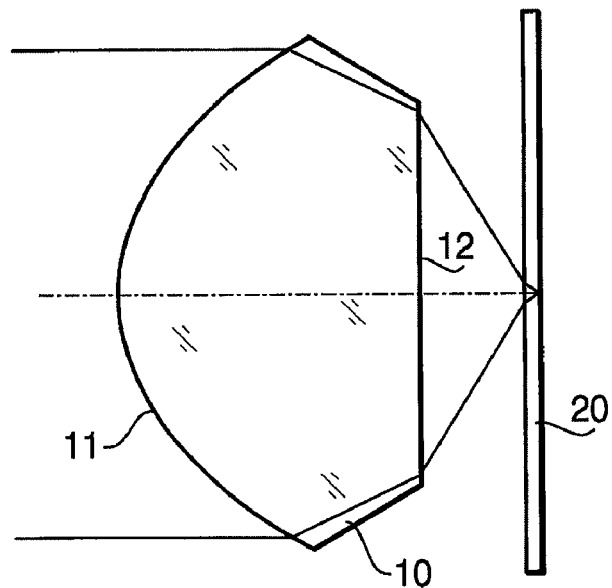
FIG. 13 is a cross sectional view illustrating an objective lens according to a fifth example.

FIG. 13 is a cross sectional view illustrating the objective lens 10 according to a fifth example and the protective layer of the optical disc 20. The following Table 9 shows a numerical structure of the objective lens 10 according to the fifth example.

TABLE 9

| f = 2.00 mm, NA = 0.85, m = 0, effective radius = 1.70 mm | | | |
|---|---|---|---|
| Surface No. | r (mm) | d (mm) | n |
| 1 | 1.463 | 2.100 | 1.709 |
| 2 | −18.501 | 0.748 | |
| 3 | ∞ | 0.100 | 1.622 |
| 4 | ∞ | | |

Each of the first and second surfaces 11 and 12 of the objective lens 10 is a rotationally-symmetrical aspherical surface. Table 10 shows the conical coefficient and aspherical coefficients defining the first and second surfaces 11 and 12 of the objective lens 10 according to the fifth example.

TABLE 10

|  | FIRST SURFACE | SECOND SURFACE |
|---|---|---|
| K | −0.580 | 0.000 |
| $A_4$ | $5.5880 \times 10^{-3}$ | $8.8020 \times 10^{-2}$ |
| $A_6$ | $2.2350 \times 10^{-3}$ | $-1.1750 \times 10^{-1}$ |
| $A_8$ | $-3.1580 \times 10^{-3}$ | $1.4350 \times 10^{-1}$ |
| $A_{10}$ | $4.1440 \times 10^{-3}$ | $-1.4550 \times 10^{-1}$ |
| $A_{12}$ | $-2.7825 \times 10^{-3}$ | $8.8748 \times 10^{-2}$ |
| $A_{14}$ | $9.6619 \times 10^{-4}$ | $-2.8684 \times 10^{-2}$ |
| $A_{16}$ | $-1.4079 \times 10^{-4}$ | $3.8019 \times 10^{-3}$ |

Figure 14:
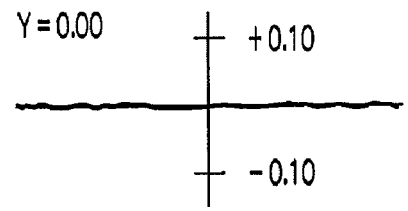
FIG. 14 is a graph illustrating the wavefront aberration of the objective lens according to the fifth example.
Figure 15:
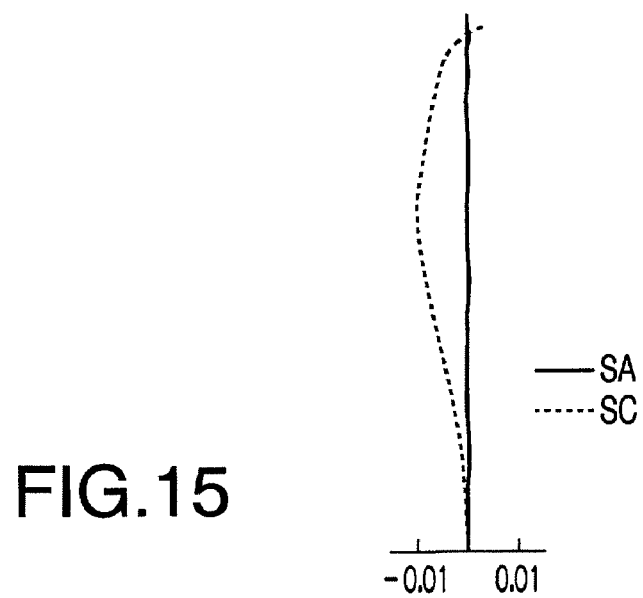
FIG. 15 is a graph illustrating the spherical aberration and the offence against the sine condition of the objective lens according to the fifth example.

FIGS. 14 and 15 show optical performance of the objective lens 10 according to the fifth example. More specifically, FIG. 14 is a graph illustrating the axial wavefront aberration, and FIG. 15 is a graph illustrating the spherical aberration (SA) and the sine condition (SC).

Sixth Example

Figure 16:
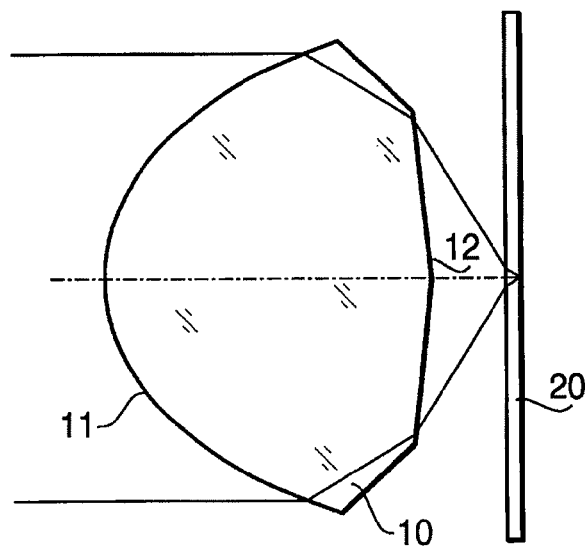
FIG. 16 is a cross sectional view illustrating an objective lens according to a sixth example.

FIG. 16 is a cross-sectional view illustrating the objective lens 10 according to a sixth example and the protective layer of the optical disc 20. The following Table 11 shows a numerical structure of the objective lens 10 according to the sixth example.

TABLE 11 f = 1.55 mm, NA = 0.85, m = 0, effective radius = 1.32 mm

| Surface No. | r (mm) | d (mm) | n |
|---|---|---|---|
| 1 | 0.984 | 1.950 | 1.525 |
| 2 | −1.491 | 0.431 |  |
| 3 | ∞ | 0.100 | 1.622 |
| 4 | ∞ |  |  |

Each of the first and second surfaces 11 and 12 of the objective lens 10 is a rotationally-symmetrical aspherical surface. Table 12 shows the conical coefficient and aspherical coefficients defining the first and second surfaces 11 and 12 of the objective lens 10 according to the sixth example.

TABLE 12

|  | FIRST SURFACE | SECOND SURFACE |
|---|---|---|
| K | −0.680 | 0.000 |
| $A_4$ | $1.9870 \times 10^{-2}$ | $8.7400 \times 10^{-1}$ |
| $A_6$ | $6.9610 \times 10^{-3}$ | −1.8290 |
| $A_8$ | $-1.5830 \times 10^{-3}$ | 2.8240 |
| $A_{10}$ | $9.8110 \times 10^{-3}$ | −2.6360 |
| $A_{12}$ | $-8.3420 \times 10^{-3}$ | $9.6090 \times 10^{-1}$ |
| $A_{14}$ | $1.1540 \times 10^{-3}$ | $8.3970 \times 10^{-1}$ |
| $A_{16}$ | $5.2688 \times 10^{-3}$ | −1.2698 |
| $A_{18}$ | $-4.9098 \times 10^{-3}$ | $6.4892 \times 10^{-1}$ |
| $A_{20}$ | $1.3306 \times 10^{-3}$ | $-1.2624 \times 10^{-1}$ |

Figure 17:
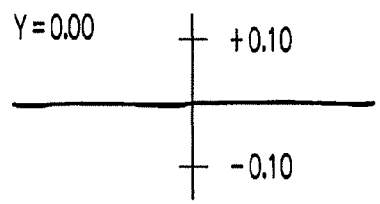
FIG. 17 is a graph illustrating the wavefront aberration of the objective lens according to the sixth example.
Figure 18:
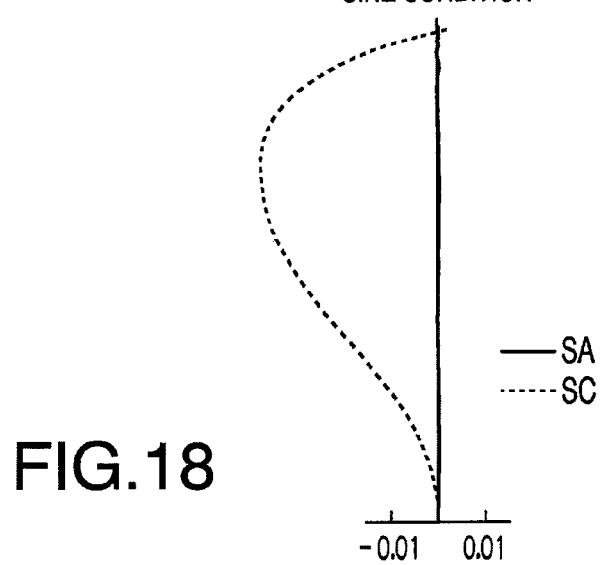
FIG. 18 is a graph illustrating the spherical aberration and the offence against the sine condition of the objective lens according to the sixth example.

FIGS. 17 and 18 show optical performance of the objective lens 10 according to the sixth example. More specifically, FIG. 17 is a graph illustrating the axial wavefront aberration, and FIG. 18 is a graph illustrating the spherical aberration (SA) and the sine condition (SC).

The following Table 13 shows, for each of the first to sixth examples, the value of the intermediate term of the condition (1), the height of the incident beam at which the offence against the sine condition of the incident beam takes a negative local minimum value, the value of the intermediate term of the condition (2), and the value of the intermediate term of the condition (3). As can be seen from Table 13, the objective lens 10 of each of the first to sixth examples satisfies the conditions (1) to (3).

TABLE 13

|  | $1^{st}$ EXAMPLE | $2^{nd}$ EXAMPLE | $3^{rd}$ EXAMPLE |
|---|---|---|---|
| $(n-1)\tan\theta_{max}$ | 1.31 | 1.37 | 0.99 |
| Beam Height Ratio of Local Minimum Value to the Effective Radius | 80% | 80% | 75% |
| $SC_{max}/f$ | −0.010 | −0.014 | −0.021 |
| $(d \cdot n)/f$ | 2.01 | 1.76 | 2.38 |
|  | $4^{th}$ EXAMPLE | $5^{th}$ EXAMPLE | $6^{th}$ EXAMPLE |
| $(n-1)\tan\theta_{max}$ | 1.19 | 1.12 | 1.42 |
| Beam Height Ratio of Local Minimum Value to the Effective Radius | 75% | 60% | 70% |
| $SC_{max}/f$ | −0.006 | −0.005 | −0.025 |
| $(d \cdot n)/f$ | 1.92 | 1.79 | 1.92 |

Table 14 shows the optical performance of the objective lens 10 according to the first example of the present invention and the optical performance of the above mentioned conventional objective lens disclosed in an example 1 of JP2003-85806A. More specifically, the Table 14 shows the amounts of the wavefront aberrations when the first surface 11 and the second surface 12 are decentered with respect to each other by 1 μm, and the amounts of the wavefront aberrations when the lens thickness increases by 2.5 μm.

TABLE 14

|  | Aberration Component | $1^{st}$ example of the present invention | Example 1 of JP2003-85806A |
|---|---|---|---|
| Decentering of 1 μm | $3^{rd}$ Order Coma by Decentering (λrms) | 0.016 | 0.060 |
|  | $5^{th}$ order Coma by Decentering (λrms) | −0.005 | 0.007 |
| Lens Thickness Increase of 2.5 μm | $3^{rd}$ Order Spherical Aberration | 0.011 | 0.037 |
|  | $5^{th}$ Order Spherical Aberration | −0.004 | 0.008 |
|  | $7^{th}$ Order Spherical Aberration | 0.001 | 0.002 |

As can be seen by making a comparison between the amounts of the wavefront aberrations of the first example of the present invention and the amounts of the wavefront aberrations of the example 1 of JP2003-85806A, the objective lens 10 according to the first example of the present invention is able to suppress the amount of the wavefront aberration, caused by the manufacturing errors including the decentering of lens surfaces and an error in lens thickness, to a low level in comparison with the objective lens of JP2003-85806A shown in Table 14 as an example of a conventional objective lens.

Although in Table 14 only the optical performance of the objective lens 10 according to the first example of the present invention is shown, it should be noted that the objective lens 10 according to each of the other examples (second to sixth examples) is also able to suppress the aberrations due to the manufacturing errors more sufficiently than the conventional objective lens in the example 1 of JP2003-85806A.

As described above, according to the embodiment of the invention, it is possible to decrease the sensitivity of the objective lens to the manufacturing errors and thereby to enhance the manufacturability of the objective lens.

This application claims priority of Japanese Patent Application No. P2007-112814, filed on Apr. 23, 2007. The entire subject matter of the application is incorporated herein by reference.

What is claimed is:

1. An objective lens for an optical pick-up, comprising:
a first surface on a light source side; and
a second surface on an optical disc side,
the first surface having a convex shape,
the objective lens being formed to be a single-element lens having a numerical aperture of 0.75 or more,
the objective lens satisfying a condition:

$$0.95 < (n-1) \cdot \tan \theta_{max} < 1.50 \qquad (1)$$

where $\theta_{max}$ represents a maximum angle of a normal to the first surface with respect to an optical axis in an effective diameter of the first surface, and n represents a refractive index of the objective lens,
wherein the objective lens satisfies a condition:

$$-0.030 < SC_{max}/f < -0.005 \qquad (2)$$

where $SC_{max}$ represents a negative local minimum value of an offence against a sine condition of the objective lens, and f represents a focal length of the objective lens.

2. The objective lens according to claim 1, wherein the objective lens has the refractive index larger than or equal to 1.7.

3. The objective lens according to claim 1, wherein the objective lens satisfies a condition:

$$1.65 < (d \cdot n)/f < 2.38 \qquad (3)$$

where f represents a focal length of the objective lens, d represents a thickness of the objective lens, and n represents a refractive index of the objective lens.

4. An objective lens for an optical pick-up, comprising:
a first surface on a light source side; and
a second surface on an optical disc side,
the first surface having a convex shape,
the objective lens being formed to be a single-element lens having a numerical aperture of 0.75 or more,
the objective lens having a negative local minimum value of an offence against a sine condition in a range of a height of an incident beam from 60 to 90 percent in an effective radius of the objective lens,
wherein the offence against the sine condition takes one local minimum value in a state of approximately full correction, and the one local minimum value is negative.

5. The objective lens according to claim 4,
wherein the objective lens satisfies a condition:

$$-0.030 < SC_{max}/f < -0.003 \qquad (2)$$

where $SC_{max}$ represents a negative local minimum value of an offence against the sine condition of the objective lens, and f represents a focal length of the objective lens.

6. The objective lens according to claim 4, wherein the objective lens has a refractive index larger than or equal to 1.7.

7. The objective lens according to claim 4,
wherein the objective lens satisfies a condition:

$$1.65 < (d \cdot n)/f < 2.50 \qquad (3)$$

where f represents a focal length of the objective lens, n represents a refractive index of the objective lens and d represents a thickness of the objective lens.

\* \* \* \* \*